United States Patent [19]

Mäder

[11] Patent Number: 5,190,985

[45] Date of Patent: Mar. 2, 1993

[54] STABLE AMINOPLAST CELLULAR FOAMS AND THE PROCESS FOR THEIR MANUFACTURE

[75] Inventor: Karl J. Mäder, Pfäffikon, Switzerland

[73] Assignee: IDC System AG, Freienbach, Switzerland

[21] Appl. No.: 768,990

[22] PCT Filed: Mar. 18, 1991

[86] PCT No.: PCT/CH91/00061

§ 371 Date: Jan. 21, 1992

§ 102(e) Date: Jan. 21, 1992

[87] PCT Pub. No.: WO91/14731

PCT Pub. Date: Oct. 3, 1991

[30] Foreign Application Priority Data

Mar. 22, 1990 [CH] Switzerland ............... 954/90

[51] Int. Cl.⁵ .................. C08J 9/00; C08J 9/02
[52] U.S. Cl. .................... 521/116; 521/117;
521/121; 521/130; 521/187; 521/188; 521/88;
521/89; 521/97
[58] Field of Search ............ 521/121, 117, 130, 116,
521/187, 188, 88, 89, 97

[56] References Cited

U.S. PATENT DOCUMENTS

| | | |
|---|---|---|
| 2,542,471 | 2/1951 | Brandon. |
| 3,919,166 | 11/1975 | Brachman. |
| 4,225,680 | 9/1980 | Williams ............... 521/188 |
| 4,390,643 | 6/1983 | Kanada et al. ............ 521/188 |
| 4,511,678 | 4/1985 | Mahnke et al. ........... 521/188 |
| 4,537,913 | 8/1985 | Baumann ............... 521/188 |

FOREIGN PATENT DOCUMENTS

| | | |
|---|---|---|
| 1054232 | 4/1959 | Fed. Rep. of Germany. |
| 2542471 | 3/1979 | Fed. Rep. of Germany. |
| 3216897 | 11/1983 | Fed. Rep. of Germany. |
| 584104 | 1/1977 | Switzerland. |
| 1090816 | 12/1967 | United Kingdom. |
| 1470953 | 4/1977 | United Kingdom. |

OTHER PUBLICATIONS

International Search Report for PCT/CH91/00061 (WO91/14731).

*Primary Examiner*—Morton Foelak
*Attorney, Agent, or Firm*—Rothwell, Figg, Ernst & Kurz

[57] ABSTRACT

Stable, emission-free, low-shrinkage, fireproof aminoplastic cellular foams are obtained by using an unsaturated, halogenated polyalcohol in the resin precondensate constituent and a dodecylbenzolsulphonic acid partially esterified preferably with a fatty alcohol and a long-chain polyhydric alcohol, preferably a polyethylene glycol, in the foaming agent hardener consituent. The foams are particularly suitable for building construction and for covering, as well as in the agricultural sector and or oil absorption. For certain of these applications, the resin pre-condensate constituent of the invention can be processed with a conventional foamer hardener constituent or the foamer hardener constituent of the invention can be processed with a conventional resin precondensate constituent.

16 Claims, No Drawings

STABLE AMINOPLAST CELLULAR FOAMS AND THE PROCESS FOR THEIR MANUFACTURE

The invention relates to stable, shrinkage-free, possibly fireproof and/or emission-free aminoplastic cellular foams and the process for manufacturing them from carbamide-formaldehyde resin condensate (subsequently referred to as "amino resin precondensate") and a hardener foaming agent as well as amino resin precondensate constituents and hardener foaming agent constituents for manufacturing such foams.

Aminoplastic resin cellular foams have been in use for decades. However, the use of these cellular foams as, for example, filling material for hollow space in building construction, has been limited thus far due to their instability, heavy shrinkage and undesirable emission of formaldehyde. This is primarily because it has not been possible to transfer the laboratory results achieved thus far to the work site (see, for example, DIN 18159, Part 2, where 4% shrinkage is tolerated). In addition, the conditions for shrinkage, related to the release of formaldehyde, have been unsatisfactorily resolved. Therefore in recent years aminoplastic cellular foams in building construction have been almost totally driven from the market.

As of today polyhydric alcohols, such as, for example, polyethylene glycol, diethylene glycol, sorbitol, etc. are state of the art additives to the resin precondensate solution (see, for example, DE-PS 1.054.232, U.S. Pat. No. 2,542,471). The use of these, presumably molecule chain stabilizing alcohols, is limited by the constituent amounts. A surplus of alcohols reduces the fireproof capability of the foams. In order to maintain this fireproof capability nevertheless, ortho-boric acid transformation products, for example, were added to alcohol surpluses as a counter measure.

By adding boric acid esters it was possible to improve the resin quality or cellular foam quality, but the products were still not completely satisfactory (DE-PS 2.542.471).

Also proposed as formaldehyde binding for the manufacture of low-formaldehyde products is the introduction into the foaming agent of carbamide in concentrated form (DE-PS 32 16 897). Resorcinol is also used for this purpose in the conventional foaming agent solutions. In addition, phosphoric acid is used as a resin (DE-PS 32 16 897).

One object of the invention under consideration is the creation of aminoplastic cellular foams with optimal stability with large volume and low weight. An additional task of the invention under consideration is the creation of low-shrinkage and/or emission-free aminoplastic cellular foams.

The term "stable" refers, in relation to the invention under consideration, to the foam's ability to resist decomposition.

The term "low-shrinkage" means in this case a linear shrinkage, at wood industry standard conditions, of less than 4%, preferably of less than 1% and generally preferred of, at the most, 0,2%.

By "emission-free" the understanding here is of foams that exhibit no detectable smell of formaldehyde during and after hardening.

These objects will be accomplished in accordance with the invention by the composition of the foaming agent hardener constituent on the one hand, and/or the resin precondensate constituents on the other. The aminoplastic cellular foams according to the invention and the process for manufacturing them as well as the foaming agent hardener constituents and resin precondensate constituents for manufacturing such foams are defined in the independent claims. Preferred embodiment foams are to be found in the dependent claims.

For the manufacture of emission-free, low-shrinkage, fireproof aminoplastic cellular foams used for the most part as sound and heat insulation in building construction, although for other purposes as well, a halogen—(preferably bromide)—alkylene-polyol, for example 1,4-dibromide-2-butene-1,4-diol, is added to the resin precondensate solution along with common polyhydric alcohols. The alkylene group of these polyols includes unsaturated olefine groups with one or more double bonds. Although the reaction mechanism has not been completely explained, it is assumed that these compounds bind with the available free formaldehyde as well as with the available methylol groups, that can convert to formaldehyde, and produce stable compounds at both high and low temperatures environments.

Along with the foam's low level of inflammability (corresponding to the specifications of Swiss Fire Class V/3) brought about by the halogen compound, aminoplastic cellular foams of historically unknown stability can be achieved with this additive. Proteolytic reactions as a result of external physical influences on the final hardened foam are completely eliminated under normal conditions.

The products suitable as aminoplastic precondensate solutions are those manufactured by conventional means, and obtained by conversion from carbamide and formaldehyde in a mol-relation 1:1.25 to 1:2.5, preferred 1:2, at about pH 4 to 6 in about 30 to 70% water solution. Resin precondensates obtained with a content of approximately 30 to 40 percentage by weight solids are preferable. These kinds of products can be obtained commercially or easily manufactured by conventional means.

These resin precondensate constituents extended with additives in accordance with the invention can be converted in a conventional manner with a known, commercial foaming agent hardener constituent, or with the foaming agent hardener constituent, according to the invention and described below, and conventionally processed to a foam.

When, on the other hand, fire resistance does not play a large role and shrinkage is unimportant, as, for example, when using the foaming agent for covering or for oil absorption, commercial carbamides formaldehyde precondensates can be converted with the foaming agent hardeners that are in accordance with the invention.

It is, however, desirable or necessary to keep the shrinkage during hardening to a minimum, as is the case, for example, in building construction, and surprisingly it was discovered that completely unexpected results are achieved when using a foaming agent solution based on dodecylbenzolsulphonic acid, which, if necessary, is partially esterified with one or more fatty alcohols, for example, a polyethylene glycol. In this case molecule chain stabilizing and therefore shrinkage reducing effects were recorded. A better surface distribution of the water and an optimal foam cell structure with simultaneous omission of foam volume loss occurred. The intensity of the foam can be optimally controlled as desired by the degree of the esterification of the sulfonic acid. Fatty alcohols with 15 to 22 carbon atoms are most suitable for esterification.

Many inorganic and organic acids, as they are known among specialists, make for suitable hardeners. It is best to use 85%, hydrous phosphoric acid requiring only a portion of the former standard amounts. The inorganic acid portion for hardening consists only ¼ to ⅓ of the established amounts necessary for the hardening of aminoplastic resin until now. The surface tension of the foaming agent can be selectively influenced by the amount of applied polyethylene glycol.

Polyethylene glycol is an additional factor in the construction of the foam structure and acts simultaneously as a shrinkage reducer in the relatively smallest proportional parts. Polyethylene of different molecular weights can be used depending upon requirements.

The foaming agents obtained according to the invention are appropriate for many uses, as packing material in building construction, in agriculture, where the foaming agents have an advantage in the working environment, as covering foams, where due to its stability a thin layer of foam results in the desired sealing quality, as well as oil absorption, particularly crude oil absorption and the like. They are biologically degradable. Because they are almost completely porous, excellent oil absorption can be achieved within an extremely short time, which is of the highest advantage for oil spills of every kind.

The mixing and foaming of components A and B and the shaping and final reduction of the foam can be achieved using conventional methods. Advantageous is the use of a device according to CH-PS 584.104.

EXAMPLE 1

Foaming Agent Hardener Solution

| Example 1: | Foaming agent hardener solution |
| --- | --- |
| 970 parts by weight | Water |
| 18 parts by weight | Dodecylbenzolsulphonic acid |
| 6 parts by weight | Phosphoric acid 85% |
| 6 parts by weight | Polyethylene glycol |
| 1,5 parts by weight | Resorcin | are processed to a homogenous solution.

This solution is suitable for the manufacture of an aminoplastic cellular foam with a very stable foam structure by the addition of a commercial aminoplastic precondensate solution (BASF), for example, in a facility as described in the CH-PS 584.104. The biologically degradable foam obtained in such a way is perfectly suitable for oil absorption, as a cover for dumping grounds and in agriculture.

EXAMPLE 2

Foaming Agent Hardener Solution

The quality constancy and the stability of the foam can be improved further if the constituent 1.5 parts by weight named in example 1 are given a $C_{15}$–$C_{22}$-fatty alcohol that esterifies with one part of the dodecylbenzolsulphonic acid. Processed with known amino-resin precondensates or a solution according to example 3 they are suitable for building construction and provide high stability as well as being shrinkage-free and odorless.

EXAMPLE 3

Resin Solution 80 to 82 parts by weight of a commercial 37 to 40% aminoplastic precondensate solution (BASF) are mixed with 10 parts by weight sorbitol and 8 to 10 parts by weight 1,4-dibromide butene diol.

EXAMPLE 4

Aminoplastic Foaming Agent

In a facility according to CH-PS 584.104 the solutions obtained in example 2 and example 3 were processed in a ratio of 1:2 to 1:3 to a fireproof foam that displays the following characteristics.

Four different samples (100×100×100 mm) were taken after the foam (14 to 18 kg/m$^3$) had been dried. These samples were subjected to climate control for 24 hours before the examination at 50 per cent by volume humidity. Then they were therm-stabilized in an oven (3 hours at about 80° C. over a steam bath). After these three hours the samples were taken from the oven and dried for 24 hours in a climate controlled room at 50 percent by volume humidity.

The mean weight loss of the four samples was 0,425 g per sample.

The mean linear mass loss per side of the cube was 1,58 mm.

An amino-resin foam of superior quality yields in practice under normal, physical conditions a linear shrinkage of at the most 0.2%. The moisture released during the drying phase contained on practical application only traces of formaldehyde, that are physiologically no longer perceptible. After subsequent drying the foam body remains stable and subsequently delivers no formaldehyde, as occurs with the more conventionally known foams.

I claim:

1. A stable aminoplastic cellular foam comprising a reaction product of an amine formaldehyde precondensate constituent (A) with a foaming agent hardener constituent (B) wherein constituent (A) contains a halogenated alkene polyalcohol and/or constituent (B) contains dodecylbenzolsulphonic acid, optionally partially esterified with a fatty alcohol, and contains a long-chain polyalcohol.

2. Foam according to claim 1 wherein constituent (A) contains 2,3-dibromide-2-butene-1,4-diol.

3. Foam according to claim 1 wherein constituent (B) contains one or more esters of dodecylbenzolsulphonic acid with $C_{15}$–$C_{22}$-fatty alcohol.

4. Foam according to claim 2 wherein constituent (B) contains one or more esters of dodecylbenzolsulphonic acid with $C_{15}$–$C_{22}$-fatty alcohol.

5. Foam according to claim 1 wherein constituent (B) contains polyethylene glycol.

6. Foam according to claim 2 wherein constituent (B) contains polyethylene glycol.

7. Foam according to claim 3 wherein constituent (B) contains polyethylene glycol.

8. A process for manufacturing a stable aminoplastic cellular foam comprising reacting an amine formaldehyde condensate constituent (A) with a foaming agent hardener constituent (B), wherein constituent (A) contains a halogenated alkene polyalcohol and/or constituent (B) contains dodecylbenzolsulphonic acid, optionally partially esterified with a fatty alcohol, and contains a long-chain polyalcohol.

9. An aminoplastic precondensate constituent for manufacturing an emission-free, fireproof foam by conversion with a foaming agent hardener constituent, wherein the aminoplastic precondensate contains a halogenated alkene polyalcohol.

10. A precondensate constituent according to claim 9 containing 2,3-dibromide-2-butene-1,4-diol.

11. A method of sound and/or heat insulating building construction comprising filling the construction with an emission-free, fireproof, low shrinkage, stable aminoplastic cellular foam comprising a reaction product of an amine formaldehyde precondensate constituent containing a halogenated alkene polyalcohol with a foaming agent hardener constituent.

12. A method according to claim 11 comprising filling the building construction with a foaming agent hardener constituent containing dodecylbenzolsulphonic acid, optionally partially esterified with a fatty alcohol, and containing a long-chain polyalcohol.

13. A method according to claim 12 comprising filling the building construction with a foaming agent hardener constituent containing dodecylbenzolsulphonic acid, optionally partially esterified with a $C_{15}$–$C_{22}$-fatty alcohol.

14. A method according to claim 13 comprising filling the building construction with a foaming agent hardener constituent containing polyethylene glycol.

15. A method of absorbing oil comprising applying a stable aminoplastic cellular foam comprising a reaction product of an amine formaldehyde precondensate constituent with a foaming agent hardener constituent containing dodecylbenzolsulphonic acid and a long-chain polyalcohol.

16. A method of covering agricultural or dumping grounds comprising applying stable aminoplastic cellular foams comprising a reaction product of an amine formaldehyde precondensate constituent with a foaming agent hardener constituent containing dodecylbenzolsulphonic acid and a long-chain polyalcohol.

* * * * *